(12) United States Patent
Liu (10) Patent No.: US 11,116,038 B2
(45) Date of Patent: Sep. 7, 2021

(54) METHOD FOR TRANSMITTING MAC PDUS AND RELATED PRODUCT

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/726,525

(22) Filed: Dec. 24, 2019

(65) Prior Publication Data
US 2020/0137826 A1 Apr. 30, 2020

Related U.S. Application Data

(63) Continuation of application No. PCT/CN2017/097189, filed on Aug. 11, 2017.

(51) Int. Cl.
*H04L 1/00* (2006.01)
*H04W 80/02* (2009.01)
*H04L 29/06* (2006.01)

(52) U.S. Cl.
CPC ............ *H04W 80/02* (2013.01); *H04L 1/0007* (2013.01); *H04L 69/22* (2013.01)

(58) Field of Classification Search
CPC ....... H04L 1/0007; H04L 29/06; H04L 69/22; H04L 69/322; H04W 28/06; H04W 4/18; H04W 80/02
(Continued)

(56) References Cited

U.S. PATENT DOCUMENTS 9,479,957 B2 10/2016 Lee et al.
2009/0092076 A1 4/2009 Zheng et al.
(Continued)

FOREIGN PATENT DOCUMENTS

CN 101803333 A 8/2010
CN 101867871 A 10/2010
(Continued)

OTHER PUBLICATIONS

Ericsson: "Text proposal for MAC sub-header format", 3GPP Draft; R2-1707115—Text Proposal for MAC Sub-Header Format, 3rd Generation Partnership (3GPP), Mobile Competence Centre. (Year: 2017).*

(Continued)

*Primary Examiner* — Melvin C Marcelo
*Assistant Examiner* — Natali N Pascual Peguero
(74) *Attorney, Agent, or Firm* — Ladas & Parry LLP (57) ABSTRACT

Embodiments of the present application disclose a data transmission method and a related product, including: a receiving end receives a data packet from a transmitting end, the data packet including a medium access control layer (MAC) protocol data unit (PDU), the MAC PDU including multiple MAC subPDUs, and at least one MAC subPDU of the multiple MAC subPDUs including a MAC sub-header; where the MAC sub-header includes a first information field, and the first information field is configured to indicate whether the MAC sub-header includes a length indication L field. The embodiments of the present application, by introducing the first information field in an existing MAC sub-header format, where the first information field can be used to dynamically indicate whether a current MAC subPDU includes an L field, are beneficial to the improvement in flexibility and efficiency of data processing at the receiving end.

16 Claims, 7 Drawing Sheets

(58) Field of Classification Search
USPC .................................................. 370/310, 329
See application file for complete search history.

(56) References Cited

U.S. PATENT DOCUMENTS

| | | | |
|---|---|---|---|
| 2010/0278111 A1* | 11/2010 | Kashima | H04W 28/065 370/328 |
| 2013/0039272 A1 | 2/2013 | Chen | |
| 2015/0163689 A1 | 6/2015 | Lee et al. | |
| 2017/0222871 A1 | 8/2017 | Yu et al. | |
| 2018/0323936 A1 | 11/2018 | Agiwal et al. | |
| 2019/0132066 A1 | 5/2019 | Park et al. | |

FOREIGN PATENT DOCUMENTS

| | | | |
|---|---|---|---|
| CN | 101911630 A | 12/2010 |
| CN | 101911762 A | 12/2010 |
| CN | 10990245 A | 3/2011 |
| CN | 102111393 A | 6/2011 |
| CN | 104579541 A | 4/2015 |
| CN | 105874832 A | 8/2016 |
| EP | 2676477 A1 | 12/2013 |

OTHER PUBLICATIONS

The EESR of corresponding European application No. 17921037.2, dated Jun. 26, 2020.
Ericsson: "Text proposal for MAC sub-header format", 3GPP Draft; R2-1707115—Test Proposal for Mac Sub-Header Format, 3rd Generation Partnership Project (3GPP), Mobile Competence Centre, 650, Route Des Lucioles, F-06921 Sophia-Antipous Cedex; Franc, vol. RAN W32, No. Qingdao; Jun. 27, 2017-Jun. 29, 2017 Jun. 26, 2017(Jun. 26, 2017), XP051301608.
Nokia et al:"LCID omitting for MAC PDU", 3GPP Draft; R2-1706585 LCID Omitting for MAC PDU, 3rd Generation Partnership Project (3GPP), Mobile Competence Centre; 650, Route Des Lucioles F-06921 Sophia-Antipolis Cedex; France, vol. RAN WG2, No. Qingdao, China; Jun. 27, 2017-Jun. 29, 2017 Jun. 16, 2017(Jun. 16, 2017), XP051306508.
International Search Report (ISR) with an English translation dated May 3, 2018 for Application No. PCT/CN2017/097189.
The EESR of corresponding European application No. 17921391.3, dated Mar. 18, 2020.
OPPO:"Dicussion on MAC sub-headers", 3GPP Draft; R2-1704061_ Discussion on MAC Sub-Header, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017(May 14, 2017), XP051274674.
The First Office Action of corresponding Chinese application No. 201780051012.9, dated Apr. 29, 2020.
3GPP TS 36.321 V8.9.0, Medium Access Control (MAC) protocol specification (Release 8), published on Jun. 30, 2010.
International Search Report (ISR) dated May 3, 2018 for Application No. PCT/CN2017/097196.
International Search Report (ISR) dated May 2, 2018 for Application No. PCT/CN2017/097183.
The second Office Action of corresponding Chinese application No. 201780051012.9, dated Oct. 27, 2019.
The first Office Action of corresponding European application No. 17921391.3, dated Nov. 20, 2020.
The Non-final rejection corresponding American U.S. Appl. No. 16/714,997, dated May 11, 2021.

* cited by examiner

METHOD FOR TRANSMITTING MAC PDUS AND RELATED PRODUCT

CROSS-REFERENCE TO RELATED APPLICATIONS

This application is a continuation of International Application No. PCT/CN2017/097189, filed on Aug. 11, 2017, the disclosure of which is hereby incorporated by reference in its entirety.

TECHNICAL FIELD

The present application relates to the field of communication technology, and in particular, relates to a data transmission method and a related product.

BACKGROUND

A Layer 2 (L2) protocol stack defined in the 3rd generation partnership project (3GPP) protocol includes three logical levels of a packet data convergence protocol (PDCP), a radio link control (RLC) protocol and a medium access control (MAC) protocol. The PDCP layer performs functions, such as data transmission, encryption, integrity protection, and head compression, of a user plane and a control plane. The RLC layer performs functions such as data packet size matching. The MAC layer performs functions such as data scheduling and mapping between logical channels and the transport channels. The whole processing flow of the L2 downlink protocol stack is: PDCP layer data is added with a PDCP header to form a PDCP protocol data unit (PDU) and send to the RLC layer; after the RLC layer performs a certain function, the received data is added with a RLC header and sent to the MAC layer; and the MAC layer multiplexes one or more MAC service data units (SDUs) to form a MAC PDU and send to a user equipment (UE). Each MAC SDU corresponds to a MAC sub-header. A MAC PDU is composed of a MAC header, zero or one or more MAC SDUs, zero or one or more MAC control elements, and possibly Padding data. The Padding data is supplementary data, and when the amount of data of the RLC layer is smaller than an actual scheduled resource, the MAC needs to patch at the end of the MAC PDU, that is, add the Padding data. A MAC header is composed of one or more MAC sub-headers, and each MAC sub-header is a sub-header corresponding to a MAC SDU or a MAC control element (MAC CE) or Padding Both the size of the MAC header and the size of the MAC SDU are variable.

SUMMARY

The embodiments of the present application provide a data transmission method and a related product, which are expected to be beneficial to the improvement in flexibility and efficiency of data processing at a receiving end.

In a first aspect, the embodiments of the present application provide a data transmission method, including:
receiving, by a receiving end, a data packet from a transmitting end, where the data packet includes a medium access control layer (MAC) protocol data unit (PDU), the MAC PDU includes multiple MAC subPDUs, and at least one MAC subPDU of the multiple MAC subPDUs includes a MAC sub-header;
where the MAC sub-header includes a first information field, and the first information field is used to indicate whether the MAC sub-header includes a length indication L field.

In a second aspect, the embodiments of the present application provide a data transmission method, including:
transmitting, by a transmitting end, a data packet, where the data packet includes a medium access control layer (MAC) protocol data unit (PDU), the MAC PDU includes multiple MAC subPDUs, and at least one MAC subPDU of the multiple MAC subPDUs includes a MAC sub-header;
where the MAC sub-header includes a first information field, and the first information field is used to indicate whether the MAC sub-header includes a length indication L field.

In a third aspect, the embodiments of the present application provide a receiving device, the receiving device has a function of implementing the behavior of the receiving device in the above method design. The function may be implemented by hardware or by hardware executing corresponding software. The hardware or software includes one or more modules corresponding to the above function. In a possible design, the receiving device includes a processor, and the processor is configured to support the receiving device to perform the corresponding function in the above method. Further, the receiving device may further include a transceiver, and the transceiver is used to support communication between the receiving device and a network device. Further, the receiving device may further include a memory, the memory is used to couple with the processor, and it stores necessary program instructions and data of the receiving device.

In a fourth aspect, the embodiments of the present application provide a transmitting device, the transmitting device has a function of implementing the behavior of the transmitting device in the above method design. The function may be implemented by hardware or by hardware executing corresponding software. The hardware or software includes one or more modules corresponding to the above function. In a possible design, the transmitting device includes a processor, and the processor is configured to support the transmitting device to perform the corresponding function in the above method. Further, the transmitting device may further include a transceiver, and the transceiver is used to support communication between the transmitting device and a terminal. Further, the transmitting device may further include a memory, the memory is used to couple with the processor, and it stores the necessary program instructions and data of the transmitting device.

In a fifth aspect, the embodiments of the present application provide a terminal, including a processor, a memory, a communication interface, and one or more programs, where the one or more programs are stored in the memory, and configured to be performed by the processor, and the program includes instructions for performing the steps in any of the methods in the first aspect of the embodiments of the present application.

In a sixth aspect, the embodiments of the present application provide a network device, including a processor, a memory, a transceiver, and one or more programs, where the one or more programs are stored in the memory, and configured to be performed by the processor, and the program includes instructions for performing the steps in any of the methods in the second aspect of the embodiments of the present application.

In a seventh aspect, the embodiments of the present application provide a computer readable storage medium, where the computer readable storage medium stores a computer program for electronic data exchange, where the computer program enables a computer to perform some or all of the steps described in any of the methods in the first aspect of the embodiment of the present application.

In an eighth aspect, the embodiments of the present application provide a computer readable storage medium, where the computer readable storage medium stores a computer program for electronic data exchange, where the computer program enables a computer to perform some or all of the steps described in any of the methods in the second aspect of the present application.

In a ninth aspect, the embodiments of the present application provide a computer program product, where the computer program product includes a non-transitory computer readable storage medium storing a computer program, and the computer program is operable to enable a computer to perform some or all of the steps described in any of the methods in the first aspect of the embodiments of the present application. The computer program product may be a software installation package.

In a tenth aspect, the embodiments of the present application provide a computer program product, where the computer program product includes a non-transitory computer readable storage medium storing a computer program, and the computer program is operable to enable a computer to perform some or all of the steps described in any of the methods in the second aspect of the embodiments of the present application. The computer program product may be a software installation package.

It can be seen that, in the embodiments of the present application, the data packet transferred between the receiving end and the transmitting end includes a MAC PDU, the MAC PDU includes multiple MAC subPDUs, and at least one MAC subPDU of the multiple MAC subPDUs includes a MAC sub-header; where the MAC sub-header includes a first information field, and the first information field is used to indicate whether the MAC sub-header includes a length indication L field. Therefore, it can be seen that the receiving end can flexibly process the received MAC PDU according to the specific information indicated by the first information field, and specifically, when the first information field indicates that a current MAC subPDU does not include the L field, the receiving end does not need to repeatedly perform read operation for the L field of the MAC subPDU, thereby reducing the data processing overhead as a whole, and being beneficial to the improvement in flexibility and efficiency of data processing at the receiving end.

BRIEF DESCRIPTION OF THE DRAWINGS

The drawings used in the description of the embodiments or the prior art will be briefly described below.

DETAILED DESCRIPTION OF THE EMBODIMENTS

First, some concepts and conventional operation manners involved in the embodiments of the application will be briefly illustrated.

The 5th-Generation mobile communication technology (5G) New Radio (NR) is a newly proposed topic in the 3rd generation partnership project (3GPP) organization. With the gradually deepening of discussion on the new generation of 5G technology, on the one hand, since the communication system is backward-compatible, a new technology developed later tends to be compatible with a previously standardized technology; on the other hand, since there already have a large number of existing designs for the 4G LTE system, in order to achieve compatibility, a lot of flexibility of 5G is sacrificed, thereby degrading the performance. Therefore, there are currently two parallel studies in the 3GPP organization, where the technical discussion group that does not consider backward-compatibility is called 5G NR.

Main application scenarios of 5G include: enhanced mobile broadband (eMBB), ultra-reliable and low latency communications (URLLC), and massive machine type of communication (mMTC), where eMBB still aims at acquiring of multimedia content, services and data by users, the demand of which is growing rapidly. On the other hand, since eMBB may be deployed in different scenarios, such as indoor, urban district, and countryside, which have relatively large difference in capabilities and needs, so it cannot be generalized, but must be analyzed in detail according to specific deployment scenarios. Typical applications for URLLC include: industrial automation, power automation, telemedicine operation (surgery), traffic safety guarantee, and so on. Typical features of mMTC include: high connection density, small data volume, delay-insensitive service, low cost and long service life of the module, and so on.

The technical solutions in the embodiments of the present application will be described below in combination with the drawings.

Figure 1:
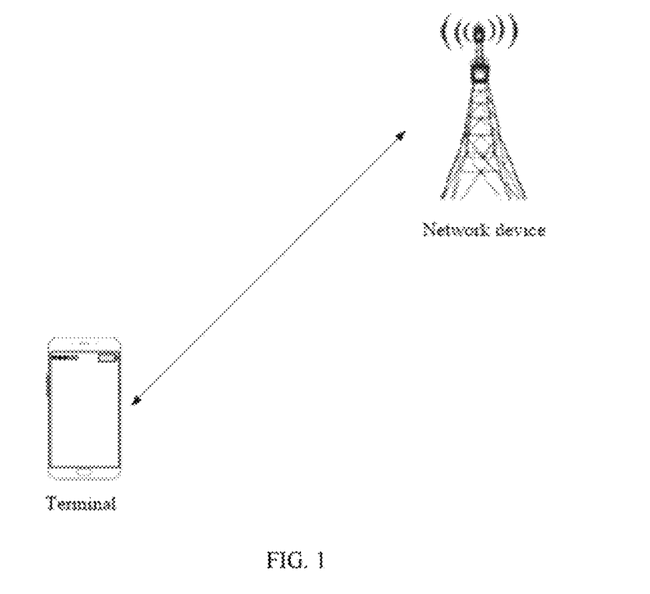
FIG. 1 is a network architecture diagram of a possible communication system according to an embodiment of the present application.

Please refer to FIG. 1, which is a possible network architecture of an example communication system according to an embodiment of the present application. The example communication system may be, for example, a 5GNR system and other such communication systems. The example communication system specifically includes a network device and a terminal. When the terminal accesses the mobile communication network provided by the network device, the terminal and the network device may be communication connected through a wireless link, and the communication connection manner may be a single-connection manner or a duel-connection manner or a multi-connection manner. When the communication connection manner is the single-connection manner, the network device may be an LTE base station or an NR base station (also called gNB base station). When the communication manner is the dual-connection manner (specifically it can be achieved by carrier aggregation (CA) technology, or by multiple network devices), and when the terminal connects to multiple network devices, the multiple network devices may be a main base station MCG and a secondary base station SCG, and the data backhaul between base stations is performed by the backhaul link. The main base station may be an LTE base station and the secondary base station may be an LTE base station, or, the main base station may be an NR base station and the secondary base station may be an LTE base station, or, the main base station may be an NR base station, and the secondary base station may be an NR base station.

In the embodiments of the present application, the terms "network" and "system" are often used interchangeably, and those skilled in the art can understand the meaning thereof. The terminals involved in the embodiments of the present application may include various devices with wireless communication functions, such as handheld devices, in-vehicle devices, wearable devices, computing devices, or other processing devices connected to wireless modems, and various forms of user equipment (UE), mobile station (MS), terminal device, and the like. For convenience of description, the devices mentioned above are collectively called terminals.

Figure 2A:
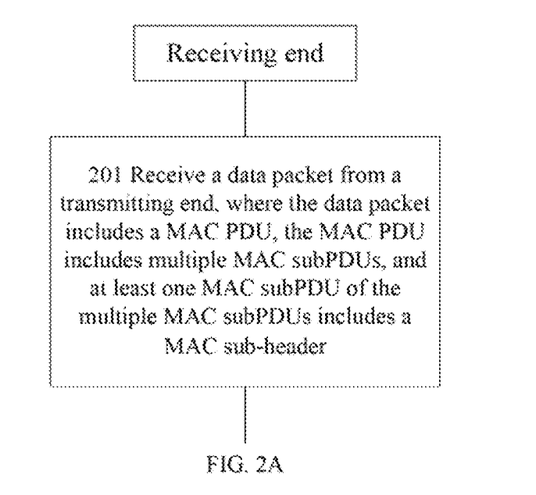
FIG. 2A is a schematic flowchart of a data transmission method according to an embodiment of the present application.

Please refer to FIG. 2A. FIG. 2A is a data transmission method according to an embodiment of the present application, which is applied to the above example communication system, and the method includes:

in section 201, a receiving end receives a data packet from a transmitting end, where the data packet includes a medium access control layer (MAC) protocol data unit (PDU), the MAC PDU includes multiple MAC PDUs, and at least one MAC subPDU of the multiple MAC subPDUs includes a MAC sub-header;

where the MAC sub-header includes a first information field, and the first information field is used to indicate whether the MAC sub-header includes a length indication L field.

The transmitting end and the receiving end are devices with a MAC layer entity and a physical layer entity, the MAC layer entity is used to assemble the MAC PDU, which is delivered to the physical layer entity, then transmitted by the physical layer entity to the receiving end through the air interface. After being processed by the physical layer entity of the receiving end, the MAC PDU is delivered to the MAC layer entity of the receiving end, and then the MAC layer entity of the receiving end resolves the MAC header, that is, reads information fields.

In this possible example, the method further includes: the receiving end reads the first information field, determines the first information field indicates that the MAC sub-header includes the length indication L field, and reads the L field.

In the possible example, the receiving end reads the first information field, and determines the first information field indicates that the MAC sub-header does not include a length indication L field, and does not perform read operation for the L field of the MAC sub-header.

It can be seen that, in the embodiment of the present application, the data packet transferred between the receiving end and the transmitting end includes a MAC PDU, the MAC PDU includes multiple MAC subPDUs, and at least one MAC subPDU of the multiple MAC subPDUs includes a MAC sub-header; where the MAC sub-header includes a first information field, and the first information field is used to indicate whether the MAC sub-header includes a length indication L field. Therefore, it can be seen that the receiving end can flexibly process the received MAC PDU according to the specific information indicated by the first information field, and specifically, when the first information field indicates that the current sub-header of MAC subPDU does not include an L field, the receiving end does not need to repeatedly perform read operation for the L field of the of MAC sub-header, thereby reducing the data processing overhead as a whole, and being beneficial to the improvement in flexibility and efficiency of data processing at the receiving end.

In a possible example, the first information field is used to indicate that the MAC sub-header includes the L field, and a format of the MAC sub-header is the first information field/an extended bit R field/a logical channel identification (LCID) field/a bit length format indication F field/the L field.

In a possible example, the first information field is used to indicate that the MAC sub-header does not include the L field, and a format of the MAC sub-header is the first information field/a second information field/a logical channel identification (LCID) field, and the second information field is used to indicate whether the receiving end reads the LCID field.

In this possible example, the method further includes: the receiving end reads the second information field, determines the second information field indicates not to read the LCID field, and the receiving end does not perform read operation for the LCID field. Or, the receiving end reads the second information field, and determines the second information field indicates to read the LCID field, and the receiving end performs read operation for the LCID field.

It can be seen that, in this example, the receiving end can determine whether the LCID field needs to be read according to the second information field, thereby avoiding additional processing caused by repeated read when the information field is not needed to be read, which is beneficial to the reduction of data processing overhead of the receiving end and improvement in data processing efficiency of the receiving end.

Figure 2B:
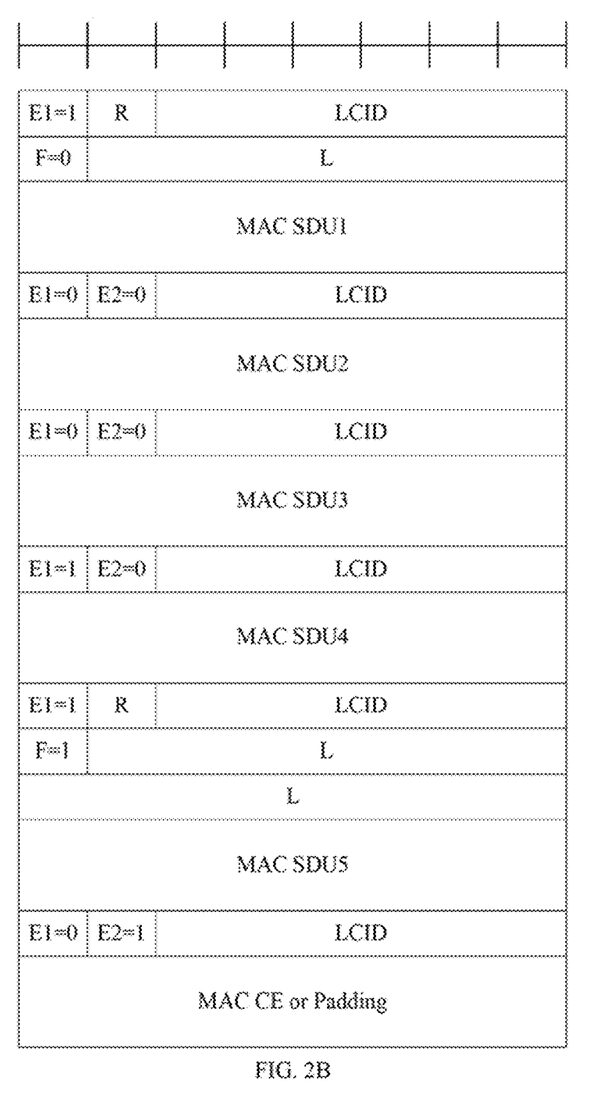
FIG. 2B is a schematic structural diagram of a MAC PDU according to an embodiment of the present application.

For example, as shown in FIG. 2B, assume that a MAC PDU in a data package includes six MAC subPDUs, and among the six MAC subPDUs, MAC subSDU1 includes MAC sub-header1 and MAC SDU1. MAC subSDU2 includes MAC sub-header2 and MAC SDU2, MAC subSDU3 includes MAC sub-header3 and MAC SDU3, MAC subSDU4 includes MAC sub-header4 and MAC SDU4, MAC subSDU5 includes MAC sub-header5 and MAC SDU5, MAC subSDU6 includes MAC sub-header6 and MAC CE or Padding, and MAC sub-header1 of the MAC SDU1 includes the L field, MAC sub-header2 of the MAC SDU2, MAC sub-header3 of the MAC SDU3 and MAC sub-header4 of the MAC SDU4 do not include the L field, MAC sub-header5 of the MAC SDU5 includes the L field, MAC sub-header6 of the MAC SDU6 does not include the L field. A possible structure of the MAC PDU is as shown in the figure:

the format of the MAC sub-header1 is E1/R/LCID/F/L, and E1=1, indicating that the MAC sub-header1 of the MAC SDU1 includes the L field;

the format of the MAC sub-header 2 is E1/E2/LCID, and E1=0, indicating that the MAC sub-header2 of the MAC SDU2 does not include the L field, and E2=0, indicating that the receiving end does not read the corresponding LCID:

the format of the MAC sub-header3 is E1/E2/LCID, and E1=0, indicating that the MAC sub-header3 of the MAC SDU3 does not include the L field, and E2=0, indicating that the receiving end does not read the corresponding LCID;

the format of the MAC sub-header 4 is E1/E2/LCID, and E1=1, indicating that the MAC sub-header 4 of the MAC SDU4 does not include the L field, and E2=0, indicating that the receiving end does not read the corresponding LCID;

the format of the MAC sub-header 5 is E1/R/LCID/F/L, and E1=1, indicating that the MAC sub-header 5 of the MAC SDU5 includes the L field;

the format of the MAC sub-header 6 is E1/E2/LCID, and E1=0, indicating that the MAC sub-header6 of the MAC SDU6 does not include the L field, and E2=1, indicating that the receiving end reads the corresponding LCID;

where E1 represents the first information field, and E2 represents the second information field.

In a possible example, the first information field is used to indicate that the MAC sub-header does not include the L field, and the format of the MAC sub-header is the first information field/the second information field/the logical channel identification (LCID) field, or the format of the MAC sub-header is the first information field/the second information field/a third information field;

where the second information field is used to indicate the LCID field or the third information field, the third information field is used to indicate multiple consecutive MAC subPDUs after the MAC sub-header, and each MAC subPDU of the multiple consecutive MAC subPDUs, except the MAC subPDU to which the MAC sub-header belongs, does not include a sub-header.

It can be seen that, in this example, the second information field indicates the LCID field or the third information field, the third information field indicates multiple consecutive MAC subPDUs after the MAC sub-header, and each MAC subPDU of the multiple consecutive MAC subPDUs, except the MAC subPDU to which the MAC sub-header belongs, does not include a sub-header. Therefore, it can be seen that the receiving end can first confirm a type of information field of a subsequent field according to the second information field, and then, if the subsequent filed information field type is determined to be the LCID field, the information field is read directly by default, and if the subsequent filed information field type is determined to be the third information field, it is determined that the MAC subPDU of the consecutive multiple MAC subPDUs, except the MAC subPDU to which the MAC sub-header belongs, does not include a sub-header, and read operation needs not to be performed for the MAC sub-header of the MAC subPDU the sub-header of which is omitted, thereby reducing the data processing overhead of the receiving end and decreasing the data volume of MAC PDU, which is beneficial to the improvement of data transmission efficiency and processing efficiency of the MAC PDU.

Figure 2C:
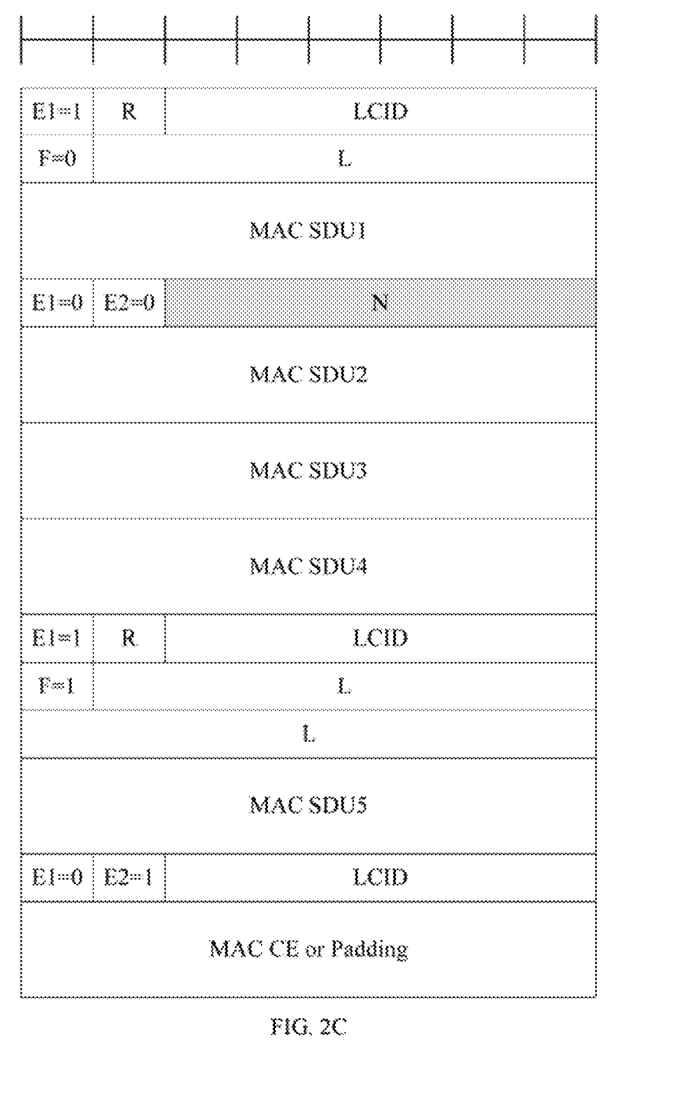
FIG. 2C is a schematic structural diagram of another MAC PDU according to an embodiment of the present application.

For example, as shown in FIG. 2C, assume that a MAC PDU in a data package includes six MAC subPDUs, and among the six MAC subPDUs, MAC subSDU1 includes MAC sub-header1 and MAC SDU1, MAC subSDU2 includes MAC sub-header2 and MAC SDU2, MAC subSDU3 includes MAC SDU3, MAC subSDU4 includes MAC SDU4, MAC subSDU5 includes MAC sub-header5 and MAC SDU5, MAC subSDU6 includes MAC sub-header6 and MAC CE or Padding, and MAC sub-header1 of the MAC SDU1 includes L field. MAC sub-header2 of the MAC SDU2, MAC SDU3 and MAC SDU4 do not have a sub-header, MAC sub-header5 of the MAC SDU5 includes L field, MAC sub-header6 of the MAC SDU6 does not include L field. A possible structure of the MAC PDU is as shown in the figure:

the format of the MAC sub-header1 is E1/R/LCID/F/L, and E1=1, indicating that the MAC sub-header1 of the MAC SDU1 includes the L field;

the format of the MAC sub-header 2 is E1/E2/N, and E1=0, indicating that the MAC sub-header2 of the MAC SDU2 does not include the L field, and E2=0, indicating the third information field, and N=3, indicating MAC SDU3 and MAC SDU4 of three consecutive MAC SDU2, MAC SDU3 and MAC SDU4 do not include a MAC sub-header;

the format of the MAC sub-header 5 is E1/R/LCID/F/L, and E1=1, indicating that the MAC sub-header 5 of the MAC SDU5 includes the L field;

the format of the MAC sub-header 6 is E1/E2/LCID, and E1=0, indicating that the MAC sub-header6 of the MAC SDU6 does not include the L field, and E2=1, indicating LCID field, read the LCID field by default:

where E1 represents the first information field, E2 represents the second information field and N represents the third information field.

In a possible example, the first information field is located in a first bit of the MAC sub-header, the second information field is located in a second bit of the MAC sub-header, and the third information field is located in a third bit to an eighth bit of the MAC sub-header.

In a possible example, a bit length of the L field of the MAC subPDU, which includes the L field, of the multiple MAC subPDUs is 7 or 15 or 8 or 16.

Figure 3:
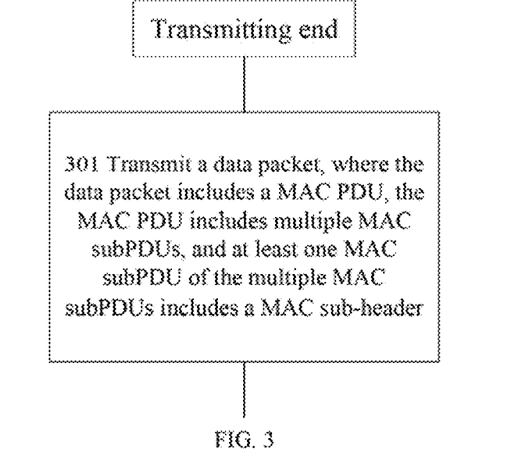
FIG. 3 is a schematic flowchart of another data transmission method according to an embodiment of the present application.

Please refer to FIG. 3. FIG. 3 is a data transmission method according to an embodiment of the present application, which is applied to the above example communication system, and the method includes:

in section 301, a transmitting end transmits a data packet, where the data packet includes a medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes a first information field, and the first information field is used to indicate whether the MAC sub-header includes a length indication L field.

It can be seen that, in the embodiment of the present application, the data packet transferred between the receiving end and the transmitting end includes a MAC PDU, the MAC PDU includes multiple MAC subPDUs, and at least one MAC subPDU of the multiple MAC subPDUs includes a MAC sub-header; where the MAC sub-header includes a first information field, the first information field is used to indicate whether the MAC sub-header includes a length indication L field. Therefore, it can be seen that the receiving end can flexibly process the received MAC PDU according to the specific information indicated by the first information field, and specifically, when the first information field indicates that the current sub-header of the MAC subPDU does not include the L field, the receiving end does not need to repeatedly perform read operation for the L field of the MAC sub-header, thereby reducing the data processing overhead as a whole, and being beneficial to the improvement in flexibility and efficiency of data processing at the receiving end.

In a possible example, the first information field is used to indicate that the MAC sub-header includes the L field, and the format of the MAC sub-header is the first information field/an extended bit R field/a logical channel identification (LCID) field/a bit length format indication F field/the L field.

In a possible example, the first information field is used to indicate that the MAC sub-header does not include the L field, and the format of the MAC sub-header is the first information field/a second information field/the logical channel identification (LCID) field, and the second information field is used to indicate whether the receiving end reads the LCID field.

In this possible example, the first information field is used to indicate that the MAC sub-header does not include the L field, and the format of the MAC sub-header is the first information field/the second information field/the logical channel identification (LCID) field, or the format of the MAC sub-header is the first information field/the second information field/a third information field;

where the second information field is used to indicate the LCID field or the third information field, the third information field is used to indicate multiple consecutive MAC subPDUs after the MAC sub-header, where each MAC subPDU of the multiple consecutive MAC subPDUs, except the MAC subPDU to which the MAC sub-header belongs, does not include a sub-header.

In a possible example, the first information field is located in a first bit of the MAC sub-header, the second information field is located in a second bit of the MAC sub-header, and the third information field is located in a third bit to an eighth bit of the MAC sub-header.

In a possible example, a bit length of the L field of the MAC subPDU, which includes the L field, of the multiple MAC subPDUs is 7 or 15 or 8 or 16.

Figure 4:
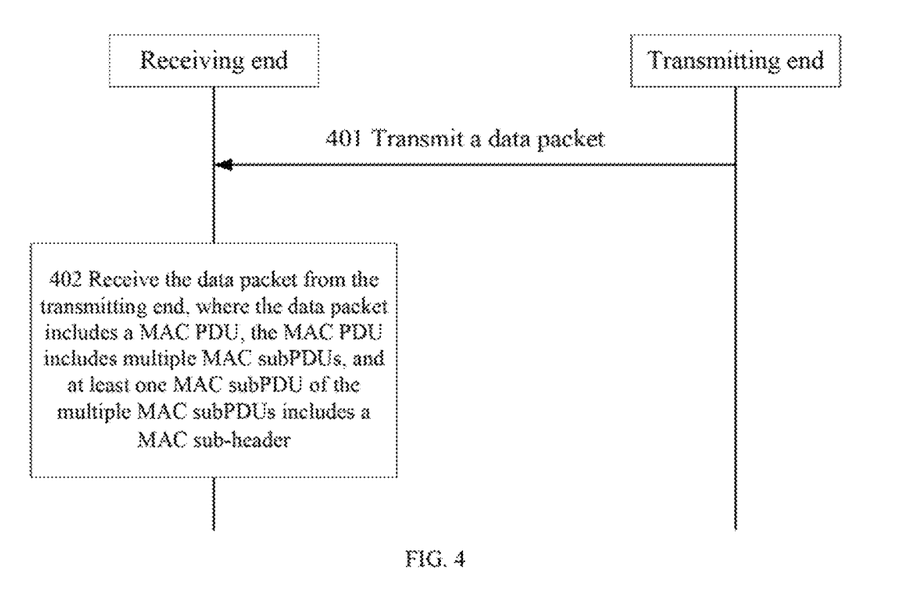
FIG. 4 is a schematic flowchart of another data transmission method according to an embodiment of the present application.

Consistent with the embodiments of FIG. 2A and FIG. 3, refer to FIG. 4. FIG. 4 is a data transmission method according to an embodiment of the present application, which is applied to the above example communication system, and the method includes:

in section 401, a transmitting end transmits a data packet, where the data packet includes a medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes a first information field, and the first information field is used to indicate whether the MAC sub-header includes a length indication L field.

In section 402, a receiving end receives the data packet from the transmitting end, where the data packet includes the medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes the first information field, and the first information field is used to indicate whether the MAC sub-header includes a length indication L field.

It can be seen that, in the embodiment of the present application, the data packet transferred between the receiving end and the transmitting end includes a MAC PDU, the MAC PDU includes multiple MAC subPDUs, and at least one MAC subPDU of the multiple MAC subPDUs includes a MAC sub-header; where the MAC sub-header includes a first information field, and the first information field is used to indicate whether the MAC sub-header includes a length indication L field. Therefore, it can be seen that the receiving end can flexibly process the received MAC PDU according to the specific information indicated by the first information field, and specifically, when the first information field indicates that the current sub-header of MAC subPDU does not include the L field, the receiving end does not need to repeatedly perform read operation for the L field of the MAC sub-header, thereby reducing the data processing overhead as a whole, and being beneficial to then improvement in flexibility and efficiency of data processing at the receiving end.

Figure 5:
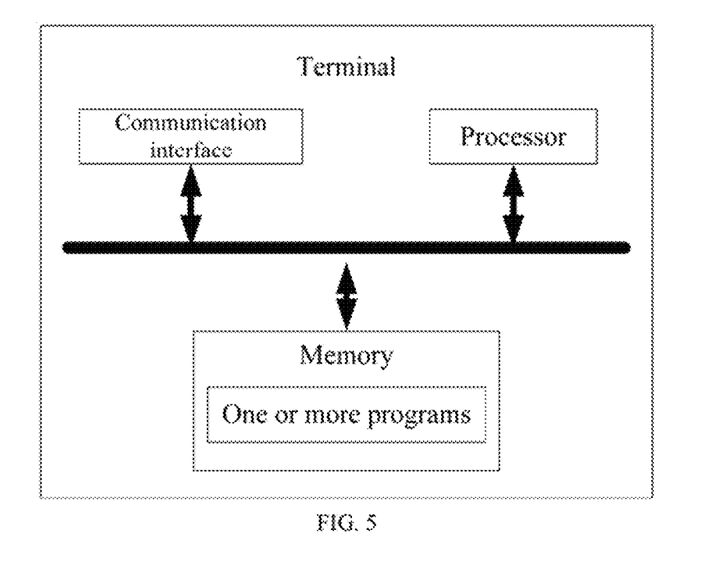
FIG. 5 is a schematic structural diagram of a terminal according to an embodiment of the present application.

Consistent with the above embodiments, refer to FIG. 5. FIG. 5 is a schematic structural diagram of a terminal according to an embodiment of the present application. As shown in the figure, the terminal includes a processor, a memory, a communication interface and one or more programs, where the one or more programs are stored in the memory, and are configured to be performed by the processor, and the program includes instructions for performing the following steps;

receiving a data packet from a transmitting end, where the data packet includes a medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes a first information field, and the first information field is used to indicate whether the MAC sub-header includes a length indication L field.

It can be seen that, in the embodiment of the present application, the data packet transferred between the receiving end and the transmitting end includes a MAC PDU, the MAC PDU includes multiple MAC subPDUs, and at least one MAC subPDU of the multiple MAC subPDUs includes a MAC sub-header; where the MAC sub-header includes a first information field, and the first information field is used to indicate whether the MAC sub-header includes a length indication L field. Therefore, it can be seen that the receiving end can flexibly process the received MAC PDU according to the specific information indicated by the first information field, and specifically, when the first information field indicates that the current sub-header of MAC subPDU does not include the L field, the receiving end does not need to repeatedly perform read operation for the L field of the MAC sub-header, thereby reducing the data processing overhead as a whole, and being beneficial to the improvement in flexibility and efficiency of data processing at the receiving end.

In a possible example, the first information field is used to indicate that the MAC sub-header includes the L field, and the format of the MAC sub-header is the first information field/an extended bit R field/a logical channel identification (LCID) field/a bit length format indication F field/the L field.

In a possible example, the first information field is used to indicate that the MAC sub-header does not include the L field, and the format of the MAC sub-header is the first information field/a second information field/the logical channel identification (LCID) field, and the second information field is used to indicate whether the receiving end reads the LCID field.

In this possible example, the first information field is used to indicate that the MAC sub-header does not include the L field, and the format of the MAC sub-header is the first information field/the second information field/the logical channel identification (LCID) field, or the format of the MAC sub-header is the first information field/the second information field/a third information field;

where the second information field is used to indicate the LCID field or the third information field, the third information field is used to indicate multiple consecutive MAC subPDUs after the MAC sub-header, where each MAC subPDU of the multiple consecutive MAC subPDUs, except the MAC subPDU to which the MAC sub-header belongs, does not include a sub-header.

In a possible example, the first information field is located in a first bit of the MAC sub-header, the second information field is located in a second bit of the MAC sub-header, and the third information field is located in a third bit to an eighth bit of the MAC sub-header.

In a possible example, a bit length of the L field of the MAC subPDU, which includes the L field, of the multiple MAC subPDUs is 7 or 15 or 8 or 16.

Figure 6:
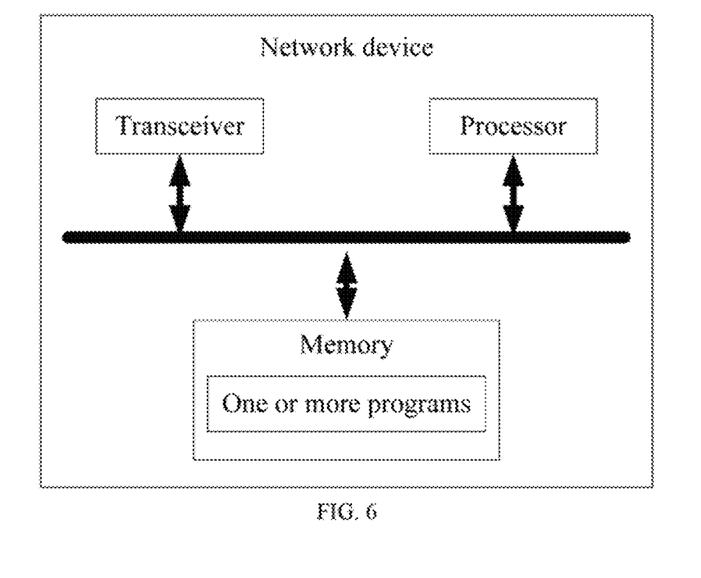
FIG. 6 is a schematic structural diagram of a network device according to an embodiment of the present application.

Consistent with the above embodiments, refer to FIG. 6. FIG. 6 is a schematic structural diagram of a network device according to an embodiment of the present disclosure. As shown in the figure, the terminal includes a processor, a memory, a transceiver and one or more programs, where the one or more programs are stored in the memory, and are configured to be performed by the processor, and the program includes instructions for performing the following steps;

transmitting a data packet, where the data packet includes a medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes a first information field, and the first information field is used to indicate whether the MAC sub-header includes a length indication L field.

It can be seen that, in the embodiment of the present application, the data packet transferred between the receiving end and the transmitting end includes a MAC PDU, the MAC PDU includes multiple MAC subPDUs, and at least one MAC subPDU of the multiple MAC subPDUs includes a MAC sub-header; where the MAC sub-header includes a first information field, and the first information field is used to indicate whether the MAC sub-header includes a length indication L, field. Therefore, it can be seen that the receiving end can flexibly process the received MAC PDU according to the specific information indicated by the first information field, and specifically, when the first information field indicates that the current sub-header of MAC subPDU does not include the L field, the receiving end does not need to repeatedly perform read operation for the L field of the MAC sub-header, thereby reducing the data processing overhead as a whole, and being beneficial to the improvement in flexibility and efficiency of data processing at the receiving end.

In a possible example, the first information field is used to indicate that the MAC sub-header includes the L field, and the format of the MAC sub-header is the first information field/an extended bit R field/a logical channel identification (LCID) field/a bit length format indication F field/the L field.

In a possible example, the first information field is used to indicate that the MAC sub-header does not include the L field, and the format of the MAC sub-header is the first information field/a second information field/the logical channel identification (LCID) field, and the second information field is used to indicate whether the receiving end reads the LCID field.

In a possible example, the first information field is used to indicate that the MAC sub-header does not include the L field, and the format of the MAC sub-header is the first information field/the second information field/a logical channel identification (LCID) field, or the format of the MAC sub-header is the first information field/the second information field/a third information field;

where the second information field is used to indicate the LCID field or the third information field, the third information field is used to indicate multiple consecutive MAC subPDUs after the MAC sub-header, where each MAC subPDU of the multiple consecutive MAC subPDUs, except the MAC subPDU to which the MAC sub-header belongs, does not include a sub-header.

In a possible example, the first information field is located in a first bit of the MAC sub-header, the second information field is located in a second bit of the MAC sub-header, and the third information field is located in a third bit to an eighth bit of the MAC sub-header.

In a possible example, a bit length of the L field of the MAC subPDU, which includes the L field, of the multiple MAC subPDUs is 7 or 15 or 8 or 16.

The solutions of the embodiments of the present application are mainly described above from the perspective of interaction between the network elements. It can be understood that, in order to achieve the above functions, the terminal and the network device include corresponding hardware structures and/or software modules for performing each function. With reference to the elements and algorithm steps of the various examples described in the embodiments disclosed herein, those skilled in the art will easily realize that the present application can be implemented in form of hardware or a combination of hardware and computer software. Whether a function is implemented in a manner of hardware or computer software driving hardware, depends on the specific application and design constraint condition of the technical solutions. Those skilled persons in the art may implement the described function for each particular application by using different methods, but such implementations should not be considered to be beyond the scope of the application.

The embodiments of the present application may perform division of functional units on the terminal and the network device according to the above method examples, for example, each functional unit may be divided corresponding to each function, or two or more functions may be integrated into one processing unit. The above integrated unit can be implemented in the form of hardware or in the form of a software program module. It should be noted that the division of unit in the embodiments of the present application is illustrative, which is only a logical function division, and in practical implementation, there may be another division manner.

Figure 7:
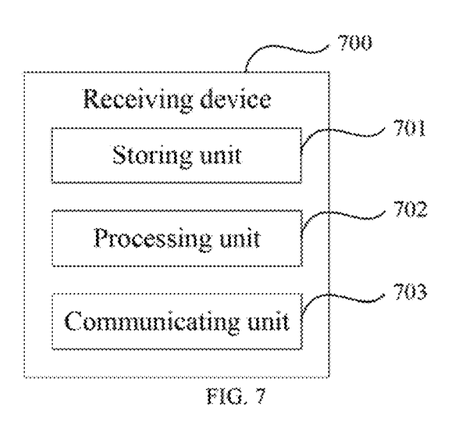
FIG. 7 is a block diagram for functional unit composition of a terminal according to an embodiment of the present application.

In the case of using an integrated unit, FIG. 7 shows a block diagram for possible functional unit composition of the receiving device involved in the above embodiments. The receiving device 700 includes: a processing unit 702 and a communicating unit 703. The processing unit 702 is used to control and manage actions of the receiving device, for example, the processing unit 702 is used to support the receiving device to perform step 201 in FIG. 2A, step 402 in FIG. 4 and/or other processes of the technology described herein. The communicating unit 703 is configured to support communication between the receiving device and other devices, such as communication with the transmitting device shown in FIG. 6. The receiving device may further include a storing unit 701, configured to store program codes and data of the receiving device.

The processing unit 702 can be a processor or a controller, for example, it may be a central processing unit (CPU), a general purpose processor, a digital signal processor (DSP), an application-specific integrated circuit (ASIC), a field programmable gate array (FPGA) or other programmable logic device, a transistor logic device, a hardware component, or any combination of them. It may implement or perform the various illustrative logical blocks, modules and circuits described in combination with the disclosure of the present application. The processor may also be a combination for implementing a computing function, for example, including a combination of one or more microprocessors, a combination of a DSP and a microprocessor, and the like. The communicating unit 703 may be a transceiver, a transceiving circuit, or the like, and the storing unit 701 may be a memory.

The processing unit 702 is used to receive a data package from a transmitting end through the communicating unit 703, where the data packet includes a medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes a first information field, and the first information field is used to indicate whether the MAC sub-header includes a length indication L field.

In a possible example, the first information field is used to indicate that the MAC sub-header includes the L field, and the format of the MAC sub-header is the first information field/an extended bit R field/a logical channel identification (LCID) field/a bit length format indication F field/the L field.

In a possible example, the first information field is used to indicate that the MAC sub-header does not include the L field, and the format of the MAC sub-header is the first information field/a second information field/the logical channel identification (LCID) field, and the second information field is used to indicate whether the receiving end reads the LCID field.

In this possible example, the first information field is used to indicate that the MAC sub-header does not include the L field, and the format of the MAC sub-header is the first information field/the second information field/the logical channel identification (LCID) field, or the format of the MAC sub-header is the first information field/the second information field/a third information field;

where the second information field is used to indicate the LCID field or the third information field, where the third information field is used to indicate multiple consecutive MAC subPDUs after the MAC sub-header, and each MAC subPDU of the multiple consecutive MAC subPDUs, except the MAC subPDU to which the MAC sub-header belongs, does not include a sub-header.

In a possible example, the first information field is located in a first bit of the MAC sub-header, the second information field is located in a second bit of the MAC sub-header, and the third information field is located in a third bit to an eighth bit of the MAC sub-header.

In a possible example, a bit length of the L field of the MAC subPDU, which includes the L field, of the multiple MAC subPDUs is 7 or 15 or 8 or 16.

When the processing unit 702 is a processor, the communicating unit 703 is a communication interface and the storing unit 701 is a memory, the receiving device involved in the embodiment of the present application may be the receiving end shown in FIG. 5.

Figure 8:
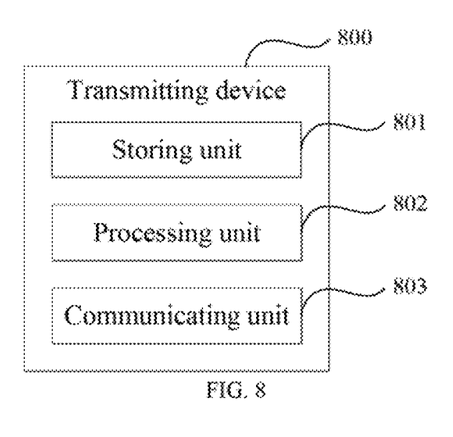
FIG. 8 is a block diagram for functional unit composition of a network device according to an embodiment of the present application.

In the case of using an integrated unit, FIG. 8 shows a block diagram for possible functional unit composition of the transmitting device involved in the above embodiments. The transmitting device 800 includes: a processing unit 802 and a communicating unit 803. The processing unit 802 is used to control and manage the actions of the transmitting device, for example, the processing unit 802 is used to support the transmitting device to perform step 301 in FIG. 3, step 401 in FIG. 4 and/or other processes of technology described herein. The communicating unit 803 is used to support communication between the transmitting device and other devices, for example communication with the receiving device shown in FIG. 5. The transmitting device may further include a storing unit 801, configured to store program codes and data of the transmitting device.

The processing unit 802 may be a processor or a controller, the communicating unit 803 may be a transceiver, a transceiving circuit, a radio frequency chip, or the like, and the storing unit 801 may be a memory.

The processing unit 802 is configured to transmit a data package through the communicating unit 803, where the data packet includes a medium access control layer (MAC) protocol data unit (PDU), the MAC PDU includes multiple MAC subPDUs, and at least one MAC subPDU of the multiple MAC subPDUs includes a MAC sub-header;

where the MAC sub-header includes a first information field, and the first information field is used to indicate whether the MAC sub-header includes a length indication L field.

In a possible example, the first information field is used to indicate that the MAC sub-header includes the L field, and the format of the MAC sub-header is the first information field/an extended bit R field/a logical channel identification (LCID) field/a bit length format indication F field/the L field.

In a possible example, the first information field is used to indicate that the MAC sub-header does not include the L field, and the format of the MAC sub-header is the first information field/a second information field/the logical channel identification (LCID) field, and the second information field is used to indicate whether the receiving end reads the LCID field.

In this possible example, the first information field is used to indicate that the MAC sub-header does not include the L field, and the format of the MAC sub-header is the first information field/the second information field/the logical channel identification (LCID) field, or the format of the MAC sub-header is the first information field/the second information field/a third information field;

where the second information field is used to indicate the LCID field or the third information field, where the third information field is used to indicate multiple consecutive MAC subPDUs after the MAC sub-header, and each MAC subPDU of the multiple consecutive MAC subPDUs, except the MAC subPDU to which the MAC sub-header belongs, does not include a sub-header.

In a possible example, the first information field is located in a first bit of the MAC sub-header, the second information field is located in a second bit of the MAC sub-header, and the third information field is located in a third bit to an eighth bit of the MAC sub-header.

In a possible example, a bit length of the L field of the MAC subPDU, which includes the L field, of the multiple MAC subPDUs is 7 or 15 or 8 or 16.

When the processing unit 802 is a processor, the communicating unit 803 is a communication interface and the storing unit 801 is a memory, the transmitting device involved in the embodiment of the present application may be the transmitting end shown in FIG. 6.

Figure 9:
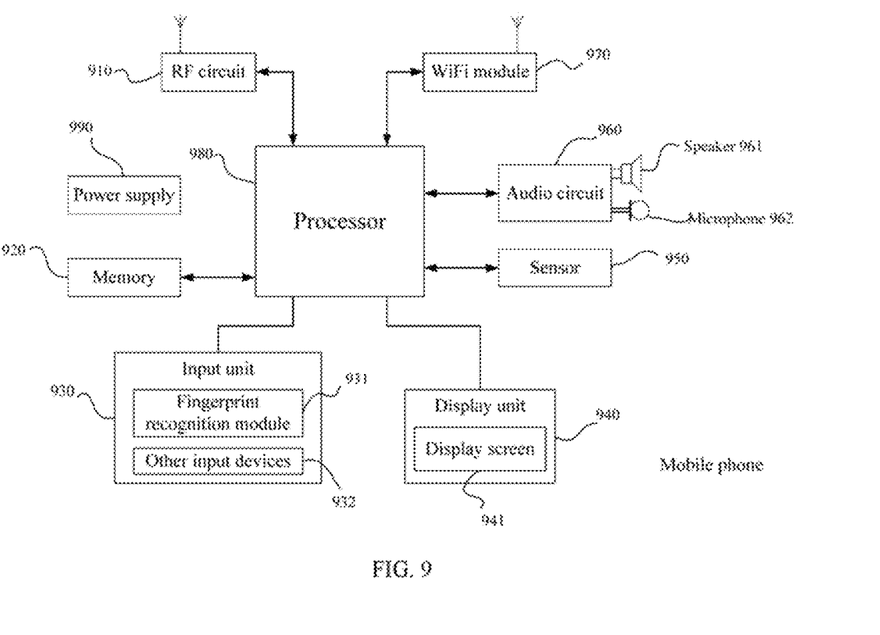
FIG. 9 is a schematic structural diagram of another terminal according to an embodiment of the present application.

The embodiment of the present application further provides another terminal, as shown in FIG. 9. For the convenience of illustration, only the parts related to the embodiments of the present application are shown, and reference may be made to the method parts of the embodiments of the present application for the specific technical details that are not disclosed. The terminal may be any terminal device including a mobile phone, a tablet computer, a personal digital assistant (PDA), a point of sales (POS), an in-vehicle computer, and the like, taking the terminal being a mobile phone as an example:

FIG. 9 shows a block diagram of partial structure of a mobile phone related to a terminal provided by an embodiment of the present application. Referring to FIG. 9, the mobile phone includes: a radio frequency (RF) circuit 910, a memory 920, an input unit 930, a display unit 940, a sensor 950, an audio circuit 960, a wireless fidelity (WiFi) module 970, a processor 980 and a power supply 990 and the like. It will be understood by those skilled in the art, the structure of the mobile phone shown in FIG. 9 does not constitute a limitation to the mobile phone, which may include more or less components than shown in the figure, or combine some components, or have a different components arrangement.

Each of the components of the mobile phone will be specifically described below in combination with the FIG. 9.

The RF circuit 910 can be used to receive and transmit information. Generally, the RF circuit 910 includes but is not limited to, an antenna, at least one amplifier, a transceiver, a coupler, a low noise amplifier (LNA), a duplexer, and the like. In addition, the RF circuitry 910 can also communicate with a network and other devices through wireless communication. The above wireless communication may use any communication standard or protocol, including but not limited to global system of mobile communication (GSM), general packet radio service (GPRS), code division multiple access (CDMA), wideband code division multiple access (WCDMA), long term evolution (LTE), E-mail, short messaging service (SMS), and the like.

The memory 920 may be used to store software programs and modules, and the processor 980 runs the software programs and modules stored in memory 920, thereby performing various functional applications and data processing of the mobile phone. The memory 920 may mainly include a program storage area and a data storage area, where the program storage area may store an operating system, an application required for at least one function, and the like; the data storage area may store data generated according to use of the mobile phone, and the like. In addition, the memory 920 may include a high-speed random-access memory, and may also include a non-volatile memory, such as at least one of magnetic disk storage device, flash memory device, or other volatile solid state storage device.

The input unit 930 may be used to receive input number or character information, and generate key signal inputs related to user settings and function controls of the mobile phone. Specifically, the input unit 930 may include a fingerprint recognition module 931 and other input devices 932. The fingerprint recognition module 931 can collect fingerprint data of the user. In addition to the fingerprint recognition module 931, the input unit 930 may also include other input devices 932. Specifically, other input devices 932 may include, but are not limited to, one or more of a touch screen, a physical keyboard, a function key (such as a volume control button, a switch button, etc.), a trackball, a mouse, an operating arm, and the like.

The display unit 940 can be used to display information input by the user or information provided to the user and various menus of the mobile phone. The display unit 940 can include a display screen 941, and in an embodiment, the display screen 941 can be configured in the form of a liquid crystal display (LCD), an organic light-emitting diode (OLED), or the like. Although in FIG. 9, the fingerprint recognition module 931 and the display screen 941 are two separate components to implement the input and play functions of the mobile phone, in some embodiments, the fingerprint recognition module 931 and the display screen 941 can be integrated to achieve the input and play functions of the mobile phone.

The mobile phone may also include at least one type of sensor 950, such as an optical sensor, a motion sensor, and other sensors. Specifically, the optical sensor may include an ambient light sensor and a proximity sensor, where the ambient light sensor may adjust the brightness of the display screen 941 according to the brightness of the ambient light, and the proximity sensor may turn off the display screen 941 and/or backlight when the mobile phone moves to an ear. As a kind of motion sensor, a accelerometer sensor can detect a magnitude of acceleration in various directions (generally three axes), it can detect the magnitude and direction of gravity when it is stationary, and it can be used for an application of mobile phone gesture recognition (such as switching between horizontal and vertical screens, related games, magnetometer altitude calibration), functions related to vibration recognition (such as pedometer, tapping), etc.; the mobile phone may also be configured with a gyroscope, a barometer, a hygrometer, a thermometer, an infrared sensor and other sensors, which will not be detailed herein.

An audio circuit 960, a speaker 961, and a microphone 962 can provide an audio interface between the user and the mobile phone. The audio circuit 960 can convert received audio data to an electrical signal and then send to the speaker 961, and the electrical signal is converted by the speaker 961 into a sound signal to play; on the other hand, the microphone 962 converts a collected sound signal into an electrical signal, which is received by the audio circuit 960 and then converted into audio data, and then processed by an audio data playback processor 980, and sent to, for example, another mobile phone through the RF circuit 910, or stored to the memory 920 for further processing.

WiFi is a short-distance wireless transmission technology, and the mobile phone can help users send and receive emails, browse web pages, and access streaming media through the WiFi module 970, which provides users with wireless broadband Internet access. Although FIG. 9 shows the WiFi module 970, it can be understood that it does not belong to the essential constitution of the mobile phone, and can be omitted as needed within the scope of not changing the essence of the disclosure.

The processor 980 is the control center of the mobile phone, which connects various parts of the entire mobile phone using various interfaces and lines, and performs various functions of the mobile phone and processes data by running or performing software programs and/or modules stored in the memory 920 and invoking data stored in the memory 920, thereby monitoring the phone on a whole. In an embodiment, the processor 980 may include one or more processing units; preferably, the processor 980 may integrate an application processor and a modem processor, where the application processor mainly processes an operating system, a user interface, an application, and the like, and the modem processor mainly processes wireless communications. It can be understood that the above described modem processor may also not be integrated into the processor 980.

The mobile phone also includes a power source 990 (such as a battery) that supplies power to each component, and preferably, the power source can be logically coupled to the processor 980 through a power management system, thereby achieving management functions such as charging, discharging, and power management through the power source management system.

Although not shown, the mobile phone may further include a camera, a Bluetooth module, and the like, which will not be detailed here.

In the foregoing embodiments shown in FIG. 2A to FIG. 4, the flow of the terminal side in each step method can be implemented based on the structure of the mobile phone.

In the foregoing embodiments shown in FIG. 5 and FIG. 6, the function of each unit can be implemented based on the structure of the mobile phone.

An embodiment of the present application further provides a computer readable storage medium, where the computer readable storage medium stores a computer program for electronic data exchange, and the computer program enables a computer to perform some or all of the steps of the terminal described in the above method embodiments.

An embodiment of the present application further provides a computer readable storage medium, where the computer readable storage medium stores a computer program for electronic data exchange, and the computer program enables a computer to perform some or all of the steps of a network device described in the above method embodiments.

An embodiment of the present application further provides a computer program product, where the computer program product includes a non-transitory computer readable storage medium storing a computer program, and the computer program is operable to enable a computer to perform some or all of the steps of the terminal described in the above method embodiments. The computer program product may be a software installation package.

An embodiment of the present application further provides a computer program product, where the computer program product includes a non-transitory computer readable storage medium storing a computer program, and the computer program is operable to enable a computer to perform some or all of the steps of the network device described in the above method embodiments. The computer program product may be a software installation package.

The steps of the method or algorithm described in the embodiments of the present application may be implemented by means of hardware, or may be implemented by a processor performing software instructions. The software instructions may be composed of corresponding software modules, and the software modules may be stored in a random access memory (RAM), a flash memory, a read only memory (ROM), an erasable programmable ROM (EPROM), an electrically EPROM (EEPROM), a register, a hard disk, a removable hard disk, a CD-ROM or any other form of storage medium known in the art. An exemplary storage medium is coupled to the processor, so that the processor can read information from the storage medium and write information to storage medium. Certainly, the storage medium may also be a part of the processor. The processor and the storage medium can be located in an ASIC. In addition, the ASIC can be located in an access network device, a target network device or a core network device. Certainly, the processor and the storage medium may also exist as discrete components in the access network device, the target network device or the core network device.

Those skilled in the art should realize that in one or more of the above examples, the functions described in the embodiments of the present application may be implemented wholly or partially by software, hardware, firmware, or any combination thereof, which, when implemented by software, may be implemented wholly or partially in the form of a computer program product. The computer program product includes one or more computer instructions. When the computer program instructions are loaded and performed on a computer, the flows or functions described in the embodiments of the present application are generated wholly or partially. The computer may be a general-purpose computer, a special purpose computer, a computer network, or other programmable device. The computer instructions can be stored in a computer readable storage medium, or transferred from one computer readable storage medium to another computer readable storage medium, for example, the computer instructions can be transferred from a website site, computer, server or data center, in a wire (e.g., coaxial cable, optical fiber, digital subscriber line (DSL)) or wireless (e.g., infrared, wireless, microwave, etc.) manner, to another website site, computer, server, or data center. The computer readable storage medium may be any available media that the computer can access, or a data storage device such as a server, a data center, or the like that is integrated with one or more available media. The available medium may be a magnetic medium (e.g., a floppy disk, a hard disk, a magnetic tape), an optical medium (e.g., a digital video disc (DVD)), or a semiconductor medium (e.g., a solid-state disk (SSD)), and so on.

In the specific embodiments described above, the purpose, technical solutions and advantages of the embodiments of the present application are further described in detail. It should be understood that the above description is only the specific embodiments of the present application, and is not used to limit the scope of protection of the embodiments of the present disclosure, and any modifications, equivalents, improvements, etc., which are made on the basis of technical solutions of the embodiments of the present application, shall fall within the scope of protection of the embodiments of the present application.

What is claimed is:

1. A data transmission method, comprising:
   receiving, by a receiving end, a data packet from a transmitting end, wherein the data packet comprises a medium access control layer (MAC) protocol data unit (PDU), the MAC PDU comprises multiple MAC subPDUs, and at least one MAC subPDU of the multiple MAC subPDUs comprises a MAC sub-header;
   wherein the MAC sub-header comprises a first information field, and the first information field is configured to indicate whether the MAC sub-header comprises a length indication L field;
   wherein the first information field is configured to indicate that the MAC sub-header does not comprise the L field, and a format of the MAC sub-header is the first information field/a second information field/a logical channel identification (LCID) field, or
   the format of the MAC sub-header is the first information field/the second information field/a third information field;
   wherein the second information field is configured to indicate the LCID field or the third information field, the third information field is configured to indicate multiple consecutive MAC subPDUs after the MAC sub-header, and each MAC subPDU of the multiple consecutive MAC subPDUs, except the MAC subPDU to which the MAC sub-header belongs, does not comprise a sub-header.

2. The method according to claim 1, wherein the first information field is further configured to indicate that the MAC sub-header comprises the L field, and the format of the MAC sub-header is the first information field/an extended bit R field/the LCID field/a bit length format indication F field/the L field.

3. The method according to claim 1, wherein the first information field is further configured to indicate that the MAC sub-header does not comprise the L field, and the format of the MAC sub-header is the first information field/a second information field/the LCID field, and the second information field is configured to indicate whether the receiving end reads the LCID field.

4. The method according to claim 1, wherein the first information field is located in a first bit of the MAC sub-header, the second information field is located in a second bit of the MAC sub-header, and the third information field is located in a third bit to an eighth bit of the MAC sub-header.

5. The method according to claim 1, wherein a bit length of the L field of the MAC subPDU, which comprises the L field, of the multiple MAC subPDUs is 7 or 15 or 8 or 16.

6. A non-volatile computer readable storage medium, which stores a computer program for electronic data exchange, wherein the computer program enables a computer to perform the method according to claim 1.

7. A terminal device, comprising a processor, a memory, a communication interface, and one or more programs, wherein the one or more programs are stored in the memory, and the processor, when executing the one or more programs, is configured to:
receive a data packet from a transmitting end through the communication interface, wherein the data packet comprises a medium access control layer (MAC) protocol data unit (PDU), the MAC PDU comprises multiple MAC subPDUs, and at least one MAC subPDU of the multiple MAC subPDUs comprises a MAC sub-header;
wherein the MAC sub-header comprises a first information field, and the first information field is configured to indicate whether the MAC sub-header comprises a length indication L field;
wherein the first information field is configured to indicate that the MAC sub-header does not comprise the L field, and a format of the MAC sub-header is the first information field/a second information field/a logical channel identification (LCID) field, or
the format of the MAC sub-header is the first information field/the second information field/a third information field;
wherein the second information field is configured to indicate the LCID field or the third information field, the third information field is configured to indicate multiple consecutive MAC subPDUs after the MAC sub-header, and each MAC subPDU of the multiple consecutive MAC subPDUs, except the MAC subPDU to which the MAC sub-header belongs, does not comprise a sub-header.

8. The terminal device according to claim 7, wherein the first information field is further configured to indicate that the MAC sub-header comprises the L field, and the format of the MAC sub-header is the first information field/an extended bit R field/the LCID field/a bit length format indication F field/the L field.

9. The terminal device according to claim 7, wherein the first information field is further configured to indicate that the MAC sub-header does not comprise the L field, and the format of the MAC sub-header is the first information field/a second information field/the LCID field, and the second information field is configured to indicate whether the receiving end reads the LCID field.

10. The terminal device according to claim 7, wherein the first information field is located in a first bit of the MAC sub-header, the second information field is located in a second bit of the MAC sub-header, and the third information field is located in a third bit to an eighth bit of the MAC sub-header.

11. The terminal device according to claim 7, wherein a bit length of the L field of the MAC subPDU, which comprises the L field, of the multiple MAC subPDUs is 7 or 15 or 8 or 16.

12. A network device, comprising a processor, a memory, a transceiver, and one or more programs, wherein the one or more programs are stored in the memory, and the processor, when executing the one or more programs, is configured to:
transmit data package through the transceiver, wherein the data packet comprises a medium access control layer (MAC) protocol data unit (PDU), the MAC PDU comprises multiple MAC subPDUs, and at least one MAC subPDU of the multiple MAC subPDUs comprises a MAC sub-header;
wherein the MAC sub-header comprises a first information field, and the first information field is configured to indicate whether the MAC sub-header comprises a length indication L field;
wherein the first information field is configured to indicate that the MAC sub-header does not comprise the L field, and a format of the MAC sub-header is the first information field/a second information field/a logical channel identification (LCID) field, or
the format of the MAC sub-header is the first information field/the second information field/a third information field;
wherein the second information field is configured to indicate the LCID field or the third information field, the third information field is configured to indicate multiple consecutive MAC subPDUs after the MAC sub-header, and each MAC subPDU of the multiple consecutive MAC subPDUs, except the MAC subPDU to which the MAC sub-header belongs, does not comprise a sub-header.

13. The network device according to claim 12, wherein the first information field is further configured to indicate that the MAC sub-header comprises the L field, and the format of the MAC sub-header is the first information field/an extended bit R field/the LCID field/a bit length format indication F field/the L field.

14. The network device according to claim 12, wherein the first information field is further configured to indicate that the MAC sub-header does not comprise the L field, and the format of the MAC sub-header is the first information field/a second information field/the LCID field, and the second information field is configured to indicate whether the receiving end reads the LCID field.

15. The network device according to claim 12, wherein the first information field is located in a first bit of the MAC sub-header, the second information field is located in a second bit of the MAC sub-header, and the third information field is located in a third bit to an eighth bit of the MAC sub-header.

16. The network device according to claim 12, wherein a bit length of the L field of the MAC subPDU, which comprises the L field, of the multiple MAC subPDUs is 7 or 15 or 8 or 16.

* * * * *